(12) United States Patent
Carey

(10) Patent No.: US 7,565,651 B1
(45) Date of Patent: Jul. 21, 2009

(54) PARALLEL TASK SCHEDULING SYSTEM FOR COMPUTERS

(75) Inventor: James E. Carey, Brookline, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/578,290

(22) Filed: May 25, 2000

(51) Int. Cl.
*G06F 9/46* (2006.01)

(52) U.S. Cl. ............... 718/100; 718/102; 718/104; 718/105; 718/106; 718/107

(58) Field of Classification Search ........... 709/100, 709/103, 102, 305, 330; 718/106, 100–105, 718/107; 719/310, 330
See application file for complete search history.

(56) References Cited

U.S. PATENT DOCUMENTS

| | | | | |
|---|---|---|---|---|
| 5,355,486 A * | 10/1994 | Cornaby | ............... | 718/102 |
| 5,438,680 A * | 8/1995 | Sullivan | ............... | 709/100 |
| 5,717,745 A * | 2/1998 | Vijay et al. | ............... | 379/112.05 |
| 5,761,507 A * | 6/1998 | Govett | ............... | 718/101 |
| 5,826,081 A * | 10/1998 | Zolnowsky | ............... | 709/103 |
| 5,844,980 A * | 12/1998 | Patel et al. | ............... | 379/88.22 |
| 6,199,068 B1 * | 3/2001 | Carpenter | ............... | 707/100 |
| 6,230,183 B1 * | 5/2001 | Yocom et al. | ............... | 718/105 |
| 6,289,369 B1 * | 9/2001 | Sundaresan | ............... | 709/103 |
| 6,298,386 B1 * | 10/2001 | Vahalia et al. | ............... | 709/234 |
| 6,323,881 B1 * | 11/2001 | Broulik et al. | ............... | 715/744 |
| 6,377,984 B1 * | 4/2002 | Najork et al. | ............... | 709/217 |
| 6,389,421 B1 * | 5/2002 | Hawkins et al. | ............... | 707/10 |
| 6,411,982 B2 * | 6/2002 | Williams | ............... | 709/102 |
| 6,418,458 B1 * | 7/2002 | Maresco | ............... | 718/103 |
| 6,430,616 B1 * | 8/2002 | Brinnand et al. | ............... | 709/224 |
| 6,438,573 B1 * | 8/2002 | Nilsen | ............... | 709/100 |
| 6,477,586 B1 * | 11/2002 | Achenson et al. | ............... | 709/330 |
| 6,484,224 B1 * | 11/2002 | Robins et al. | ............... | 710/305 |
| 6,526,422 B1 * | 2/2003 | Flood et al. | ............... | 707/206 |
| 6,687,729 B1 * | 2/2004 | Sievert et al. | ............... | 718/102 |
| 6,711,607 B1 * | 3/2004 | Goyal | ............... | 709/203 |
| 6,823,351 B1 * | 11/2004 | Flood et al. | ............... | 707/206 |
| 2001/0010090 A1 * | 7/2001 | Boyle et al. | | |
| 2002/0004966 A1 * | 1/2002 | Wakat et al. | | |
| 2002/0021707 A1 * | 2/2002 | Sampath et al. | | |
| 2003/0225815 A1 * | 12/2003 | Brenner et al. | ............... | 709/106 |

* cited by examiner

*Primary Examiner*—Andy Ho
(74) *Attorney, Agent, or Firm*—Chapin IP Law, LLC; Barry W. Chapin, Esq.

(57) ABSTRACT

A parallel task scheduling system in a multi-threaded computing environment includes a plurality of parallel task queues. Each task queue is associated with a respective worker thread from a plurality of worker threads. Each new task is assigned to one of the task queues. That assignment process including selecting a random queue and, from that starting point, locating an empty queue (if one exists). The task is then placed on that empty queue for processing.

Typically, the worker thread associated with the identified task queue will process the queued task. If the worker thread is busy processing another task, the queued task may be stolen by a free thread. A waiting task, can thus be processed in an efficient manner.

42 Claims, 7 Drawing Sheets

PARALLEL TASK SCHEDULING SYSTEM FOR COMPUTERS

BACKGROUND

In computers, application programs execute software instructions on a processor to perform work. Modem computers allow those instructions to be divided into discrete tasks for processing. In a multi-threaded computing environment, the tasks are assigned to multiple computing threads for processing. The threads perform the task and return results to the application program.

In a typical free-thread environment, any available thread can be used to process a task. Tasks are assigned to worker threads by provider threads executing thread manager instructions. There is no predefined relationship between a worker thread and a task or application.

Typically, the thread manager queues tasks into a single task queue. When a worker thread becomes available, the next task in the task queue is assigned to that worker thread on a first-in, first-out basis. On a busy system, the worker threads can all be busy at any particular time. As a result, new tasks cannot be immediately assigned to a thread. This causes the single queue to become populated with waiting tasks.

SUMMARY

One problem with using a single queue to feed tasks to a plurality of worker threads is that it results in lock contention. When a worker thread becomes available, the queue is locked until the first waiting task is located and assigned to the thread. Subsequently freed threads must wait on that lock before proceeding, causing a bottleneck. In a busy system, the free—but idling—worker threads can become a wasted resource because they spend a considerable amount of time in a wait state.

One solution to the problem is to define a task space as a plurality of task queues. Each task queue can then be associated with a respective worker thread. This approach can diminish lock contention problems because a free worker thread would generally only cause its own task queue to be locked. Other subsequently freed worker threads could continue to process tasks from their own task queues.

Such parallel task queues can use a task scheduling algorithm to distribute tasks amongst the queues. To obtain an even distribution, a random number generator can be employed to select a task queue. Although the randomly selected queue may be busy, it provides a starting point for locating an empty queue. Once an empty queue is located, the new task is placed on that queue for processing by the associated task.

While the randomization can evenly distribute the work, the task still may not be efficiently removed from its assigned queue. To reduce the waiting time of queued tasks, the task scheduling algorithm can include a method of stealing a queued task. In particular, a freed worker thread first checks its associated queue. If the queue is empty, the worker thread searches the other queues for a waiting task. That task can then be moved to the empty queue and processed by the worker thread.

BRIEF DESCRIPTION OF THE DRAWINGS

The foregoing and other objects, features and advantages of the parallel task scheduling system for computers will be apparent from the following more particular description of embodiments, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
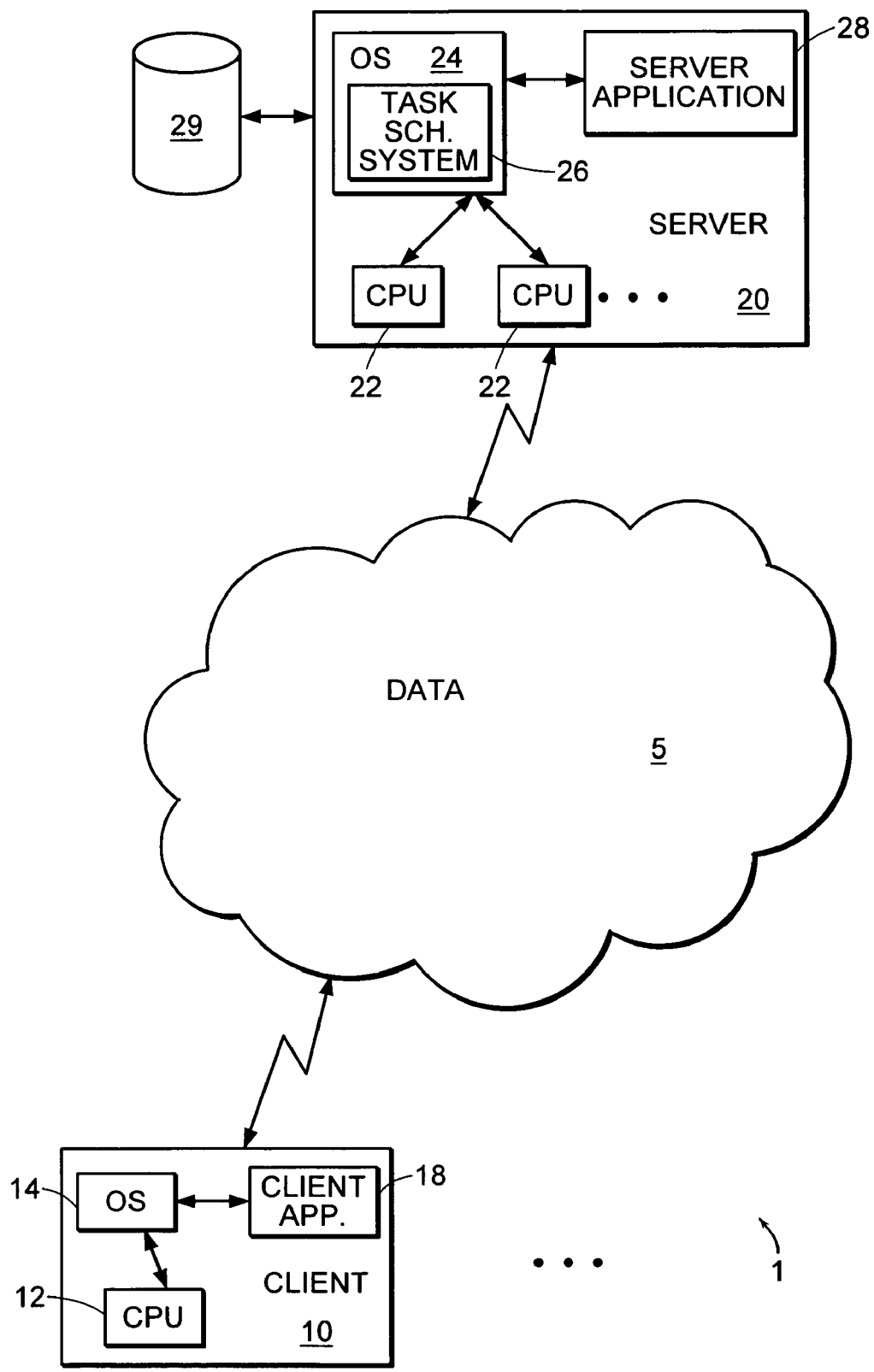
FIG. 1 is a schematic block diagram of a client-server computing environment.

FIG. 1 is a schematic block diagram of a client-server computing environment. In the environment 1, a client computer 10 communicates with a server computer 20 over a communications medium 5. The communications medium 5 may be any wired or wireless interconnection between the client 10 and server 20, including a direct network connection or a public switched communications network, such as the Internet. The server 20 can be a multi-processor 22 computer for accessing and manipulating data stored in a data store 29.

As shown, the client 10 is generally a single-processor 12 computer under the control of an operating system. The client 10 executes client application software 18 to perform work for a user. Some of that work may need to be handled by the server 20. In that event, a request is passed by the client 10 to the server 20.

The server 20 receives the request for processing by a server application 28. The software instructions that process that request have been assigned by the compiler to one or more discrete tasks. A task scheduling system 26 within the server operating system 24 is responsible for making sure each task is processed. After each task is completed, results are returned to the server application 28. Ultimately, the client request is filled and results are returned to the client application 18.

Although a task can be initiated on the server 20 by a client request, a task can be initiated by applications on the server 20 itself. Of course, the server application 28 can be simultaneously responding to requests from multiple clients 10. Problems with scheduling tasks become most acute when the server 20 is busy executing many tasks.

A particular embodiment is Oracle Express Server, version 6.3, commercially available from Oracle Corporation, Redwood Shores, California. In this embodiment, the server 20 accesses database data from the data store 9. Specifically, the database is a multidimensional database that can be simultaneously accessed by multiple users.

Figure 2:
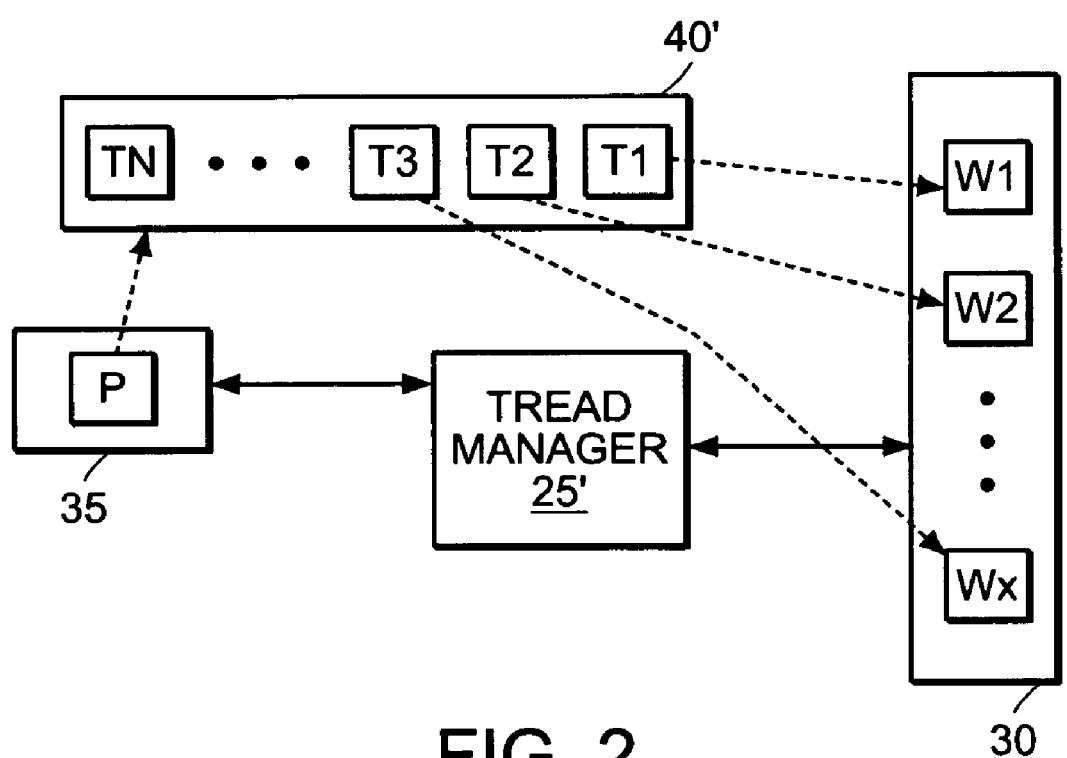
FIG. 2 is a block diagram of a prior art task scheduling system.

FIG. 2 is a block diagram of a prior art task scheduling system 26'. A thread manager 25' coordinates the processing of tasks. A plurality of worker threads W1 . . . Wx are processing threads in a worker thread pool 30. A plurality of work tasks T1 . . . TN are maintained on a task queue 40'. A provider thread P (possibly from a provider thread pool 35) executes thread manager 25' instructions to queue a task. When it receives a new task, the provider thread P acquires a mutually exclusive (Mutex) lock on the task queue 40'. The new task is then queued at the queue tail. The provider thread P then releases the lock. In this way, the provider thread P puts tasks waiting to be processed onto a single queue.

The worker threads W1 . . . Wx remove all tasks from that single queue. When a worker thread (say Wx) is freed, it executes thread manager 25' instructions to acquire a task to execute. The worker thread Wx locks the task queue 40' through a Mutex lock and locates the task (say T3) at the head of the queue 40'. That task T3 is then assigned to the worker thread Wx. The worker thread Wx then releases the lock. The worker thread Wx processes the assigned task and returns the results.

The provider and worker threads use the Mutex lock to cooperatively manage the task queue 40'. While the queue is locked, freed worker threads, and any executing provider threads, must wait on the lock before accessing the task queue 40'. Although this technique maintains the first-come, first-served order of the task queue 40', the worker threads can collide trying to remove tasks from the task queue 40'. Because the task queue 40' is accessed in a single-threaded manner, the worker threads are forced to serially access the queue 40'. This single-threaded access can cause a large amount of thread context switching and can be very inefficient.

Figure 3:
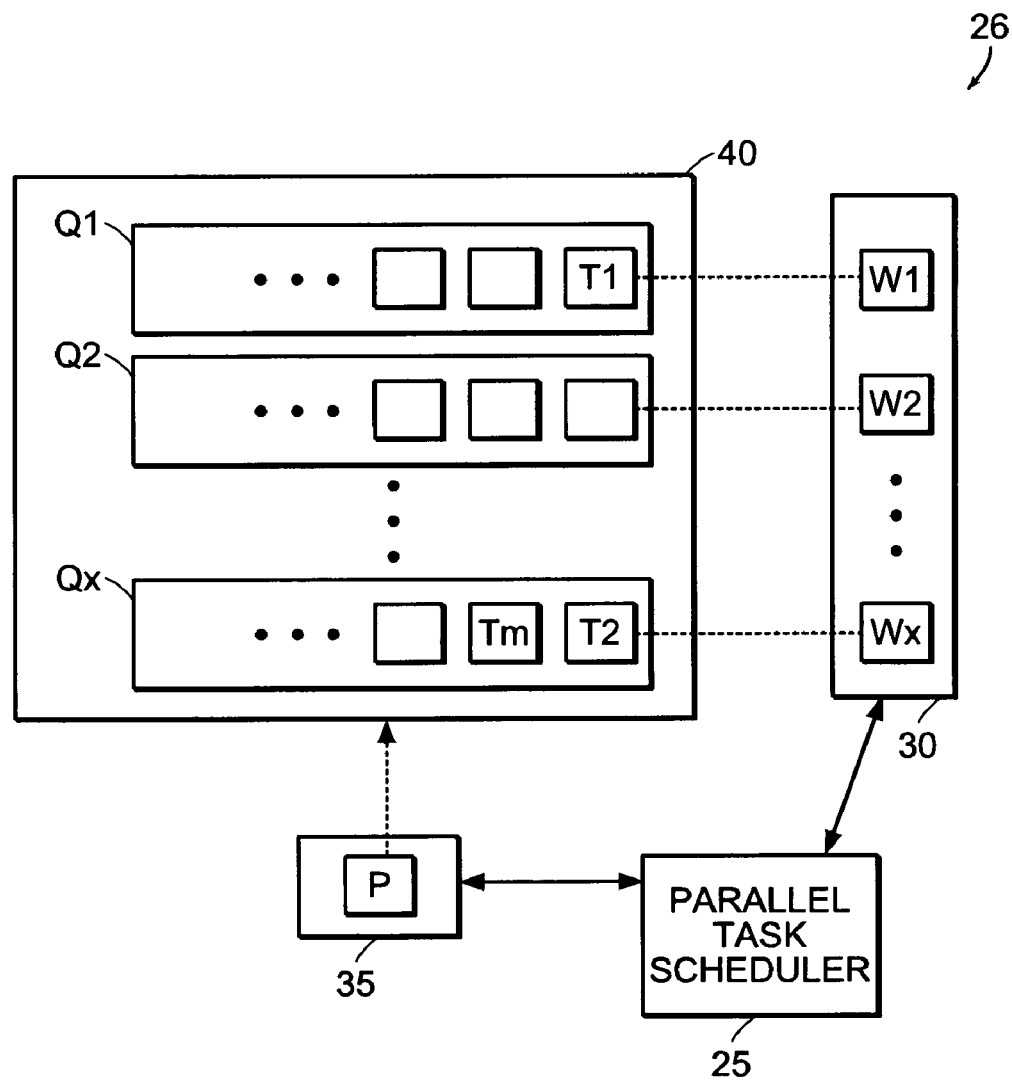
FIG. 3 is a schematic block diagram of a parallel task scheduling system.

FIG. 3 is a schematic block diagram of a parallel task scheduling system 26. As in FIG. 2, a plurality of worker threads W1 . . . Wx are maintained in a worker thread pool 30. There are, however, a plurality of task queues Q1, . . . , Qx in a queue space 40. As illustrated, each task queue Q1 . . . Qx is associated with a respective worker thread W1, . . . , Wx. Each task queue can store a plurality of individual tasks. A parallel task scheduler 25 manages the assignment of tasks to threads.

As illustrated, the first task queue Q1 has one queued task, T1. The second task queue Q2 is empty. The last task queue Qx has two queued tasks T2, Tm. Here, although the second worker thread W2 is free, the last worker thread Wx is overburdened.

Such bottlenecks can occur because not all tasks are of equal complexity. A worker thread that draws a complex task can have a populated task queue, while a worker thread that draws simple tasks has an empty task queue. As a result, the processing of a simple task can be delayed by a complex task. It is therefore still possible that the associated worker thread (e.g. Wx) is overburdened by a complex task (e.g. T2) and will not process the queued task (e.g. Tm) immediately.

To reduce bottlenecks, the task scheduling system 26 attempts to place a new task on an empty task queue, if one exists. In particular, the task scheduling algorithm uses a random number generator to identify an initial, seed queue. If that randomly selected queue is not empty, the algorithm marches through the queues—starting from the seed queue—until an empty queue is found. The task is then placed on that queue.

Just because an empty queue has been found, however, does not guarantee that the queued task will be processed quickly. The associated worker thread may still be busy processing a complex task. The queue task may have to wait for the processing task to finish. Also, depending on the implementation of the system 26 and the system configuration, the randomly selected queue may not be empty.

Because any worker thread is suitable for processing any task, the parallel task scheduling system 26 can take advantage of additional methods to increase performance. In particular, another method is used by freed worker threads to steal waiting tasks from busy queues.

Using the parallel queue approach, each task queue is primarily processed by the associated (or owning) worker thread, with periodic access from the task provider thread and infrequent access from the other worker threads as they finish their tasks. Because there are an increased number of locks controlling access to the queues and a decreased number of threads attempting to gain access to the queues, the process in much more efficient and scalable.

Figure 4:
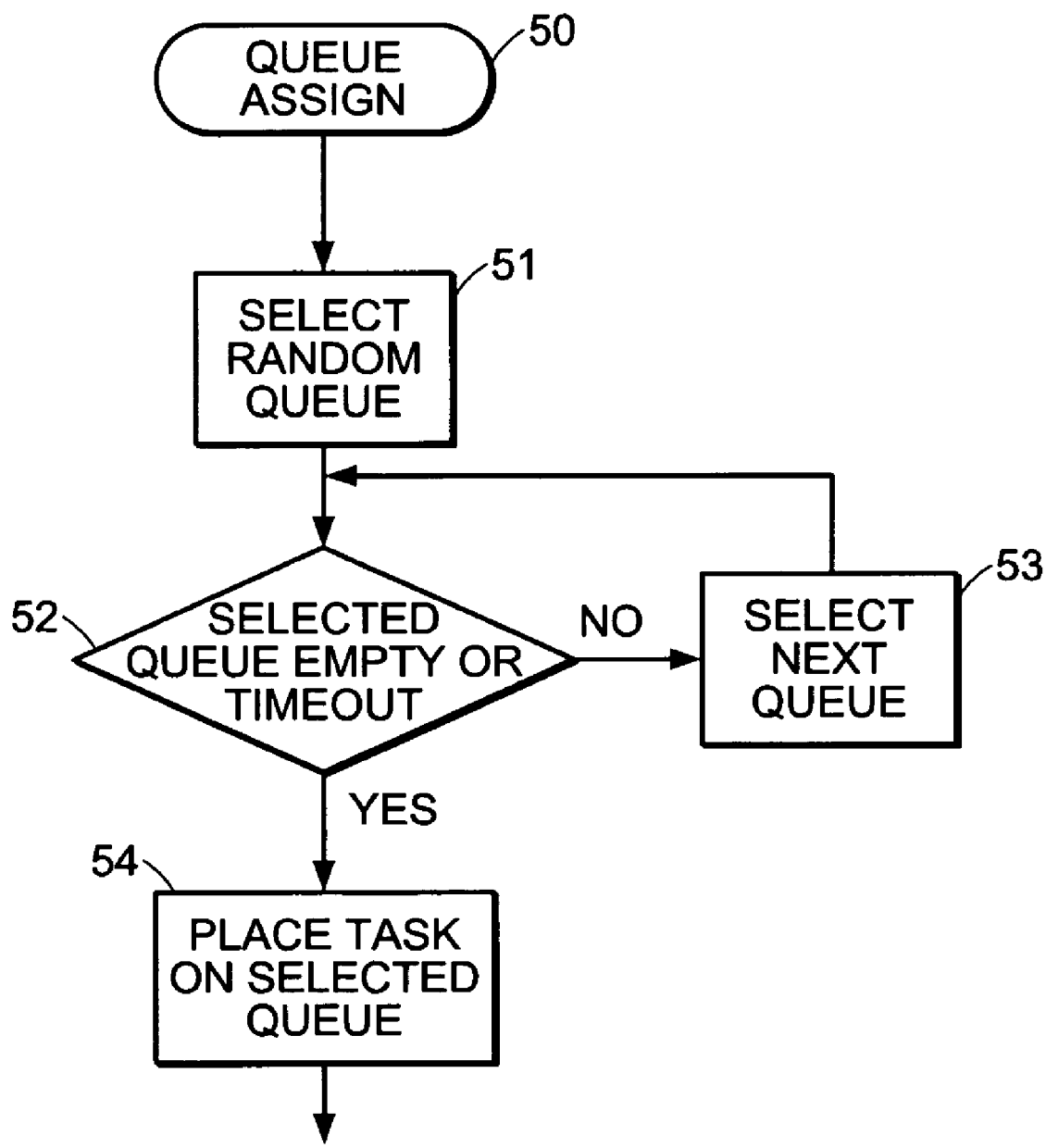
FIG. 4 is a flowchart for a queue assignment method of the parallel task scheduler of FIG. 3.

FIG. 4 is a flowchart for a queue assignment method of the parallel task scheduler of FIG. 3. The queue assignment method 50 addresses how new tasks are queued for processing. This method is executed by a provider thread P.

The method first selects a random queue at step 51. A pseudo-random number generator (PRNG) is used to pick a queue number, modulo x, when x is the count of task queues. It should be noted that the particular PRNG is not critical to operation of the method, so any convenient PRNG can be used.

At step 52, the selected queue is locked by the method and first examined to determine if it is an empty queue. If the queue is not empty, the lock may be released and the next queue selected at step 53 by incrementing the queue number (modulo x). This process can continue until an empty queue is found, at step 52. In addition, the search can be halted after a specific time-out condition has been met, such as a predetermined number of increments. In an appropriately configured system, however, an empty queue should be found with little searching.

In another embodiment of step 52, the provider thread "peeks" at the associated queue, without a lock, to see if the queue is in a busy state. This is done by looking at the queue without holding the Mutex. While the peeker cannot operate on the queue using the information retrieved from the peek, the answer to the question "Is the queue empty?" is valid. This check, while not guaranteed accurate, can be very fast and allows worker threads that may be busy to be skipped with little penalty to the speed of the check.

The protocol described for the queuing task guarantees that a task deposited by the task provider will have an active thread if the queue belonged to a waiting thread. If the queue is not empty, then the matching worker must either be busy, or be about to remove the task. If there is a task queued, the Mutex is taken to be sure it is really there (not in the process of being removed); if there is no task there, we do not need to take the lock to be sure there is no task there.

Consequently, when a queue is found that does not appear busy, the controlling lock on the queue is taken. If the queue is really empty, the task is deposited on the associated queue. In a small number of cases, the queue may no longer be empty after the lock is taken. In that case, the lock is dropped and the search continues. It is important to note that this type of collision should happen infrequently—e.g., on a very busy server.

In any event, an empty queue will generally be found. At step 54, the task is placed on the selected queue and the method releases the lock. The worker thread associated with that queue should process the task. If the associated worker thread is busy processing a complex task, it may take a relatively long time for the worker thread to again access its queue. Unless dealt with, that scenario could reduce processing efficiency.

Figure 5:
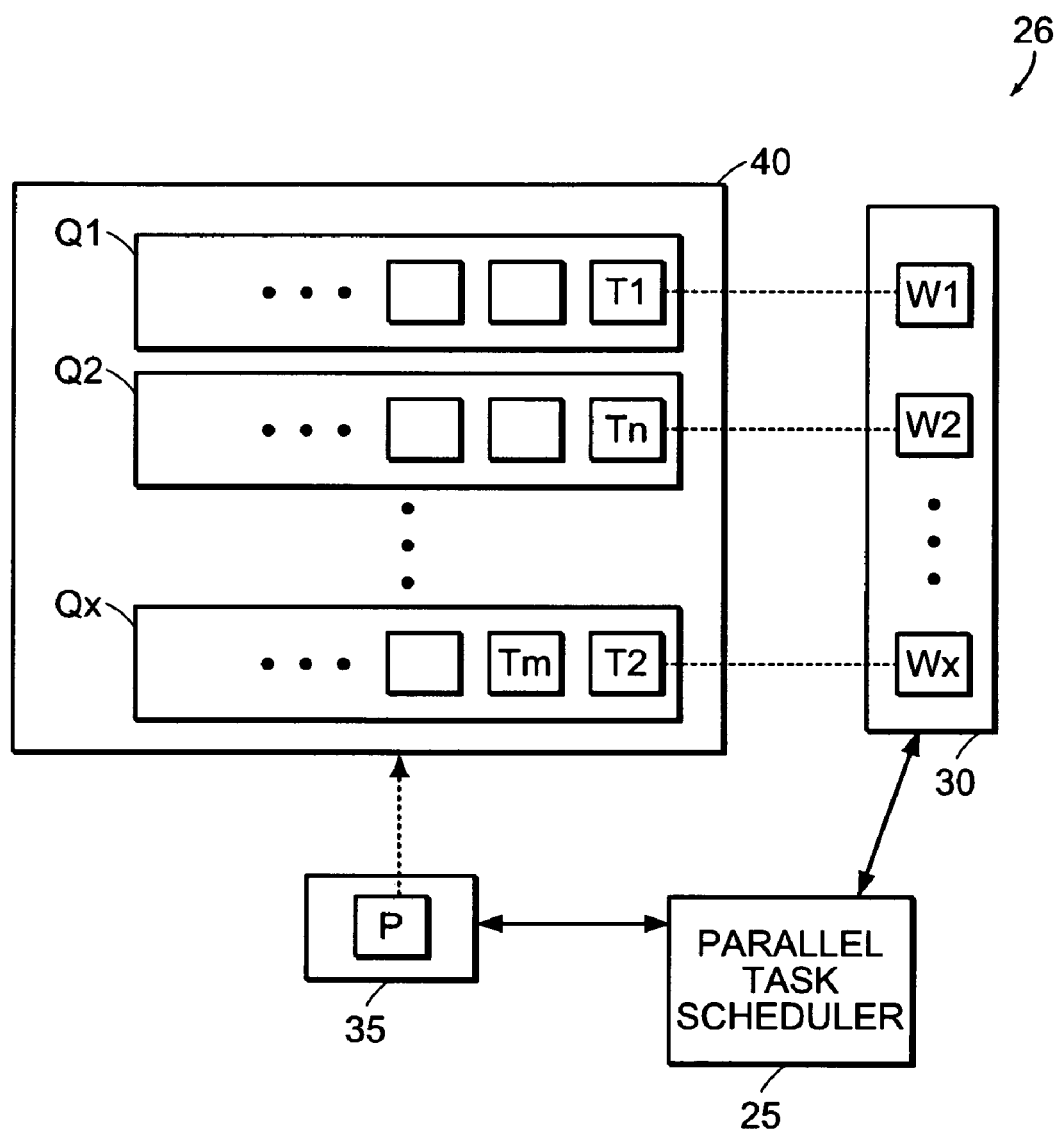
FIG. 5 is a schematic block diagram of the system of FIG. 3 showing the assignment of a new task.

FIG. 5 is a schematic block diagram of the system of FIG. 3 showing the assignment of a new task. As shown, the task assignment method 40 (FIG. 4) has found the empty task queue Q2 (FIG. 3). As a result, the new task Tn has been added to that queue Q2 for processing by the associated worker thread W2.

Figure 6:
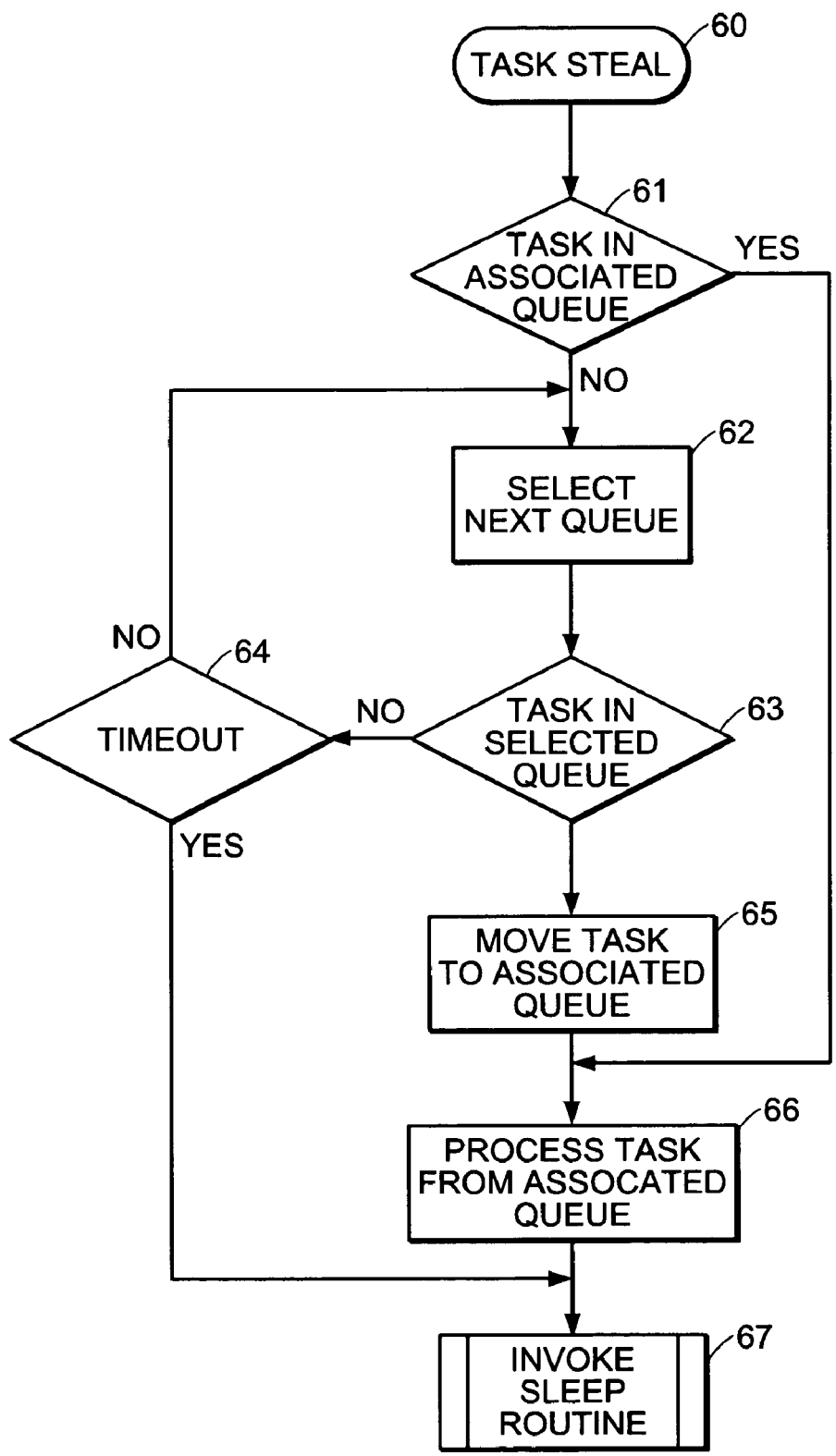
FIG. 6 is a flowchart of a task stealing method of the parallel task scheduler of FIG. 3.

FIG. 6 is a flowchart of a task stealing method of the parallel task scheduler of FIG. 3. The method 60 is initiated by a worker thread completing a task. In a particular embodiment, upon completing a task, a worker thread goes through a wake-up process to reinitialize its thread data and to grab a new task. One problem is that the associated queue can be empty, while other queues are populated. In general, such a situation may arise only when there are more tasks available for processing than there are threads to process the tasks.

At step 61, the worker queue is examined. If the queue is populated with a task, then processing jumps to step 66 to process that task. If the queue is empty, however, the method 60 begins searching for a task queued in a queue for another worker thread.

The effort of finding another task begins at step 62, where, the next queue is selected. The selection can be made by simply incrementing the queue number, modulo x. Other techniques can also be used.

Processing then continues to step 63, where the selected queue is examined. If a task is queued, processing continues to step 65. Otherwise, processing continues to step 64.

At step 64, an optional time-out check can be made. In one embodiment, the check is based on a complete cycle through the queues. That is, if the queue number is incremented back to the worker's queue number, then processing can jump to step 67 to discontinue. The time-out could also be a predetermined number of increments. The time-out could also result from an interrupt resulting from a task being queued to the worker thread's previously empty queue. As another alternative, idle threads can continuously scan for stealable tasks. Until a time-out, processing returns to step 62 to select the next candidate queue.

Once a stealable task is found, the task is moved from the selected queue to the worker's queue at step 65. At step 66, the first task in the worker's queue is processed by the worker thread.

After completion of the task, or a timeout, the worker thread is placed into a sleep mode at step 67.

Figure 7:
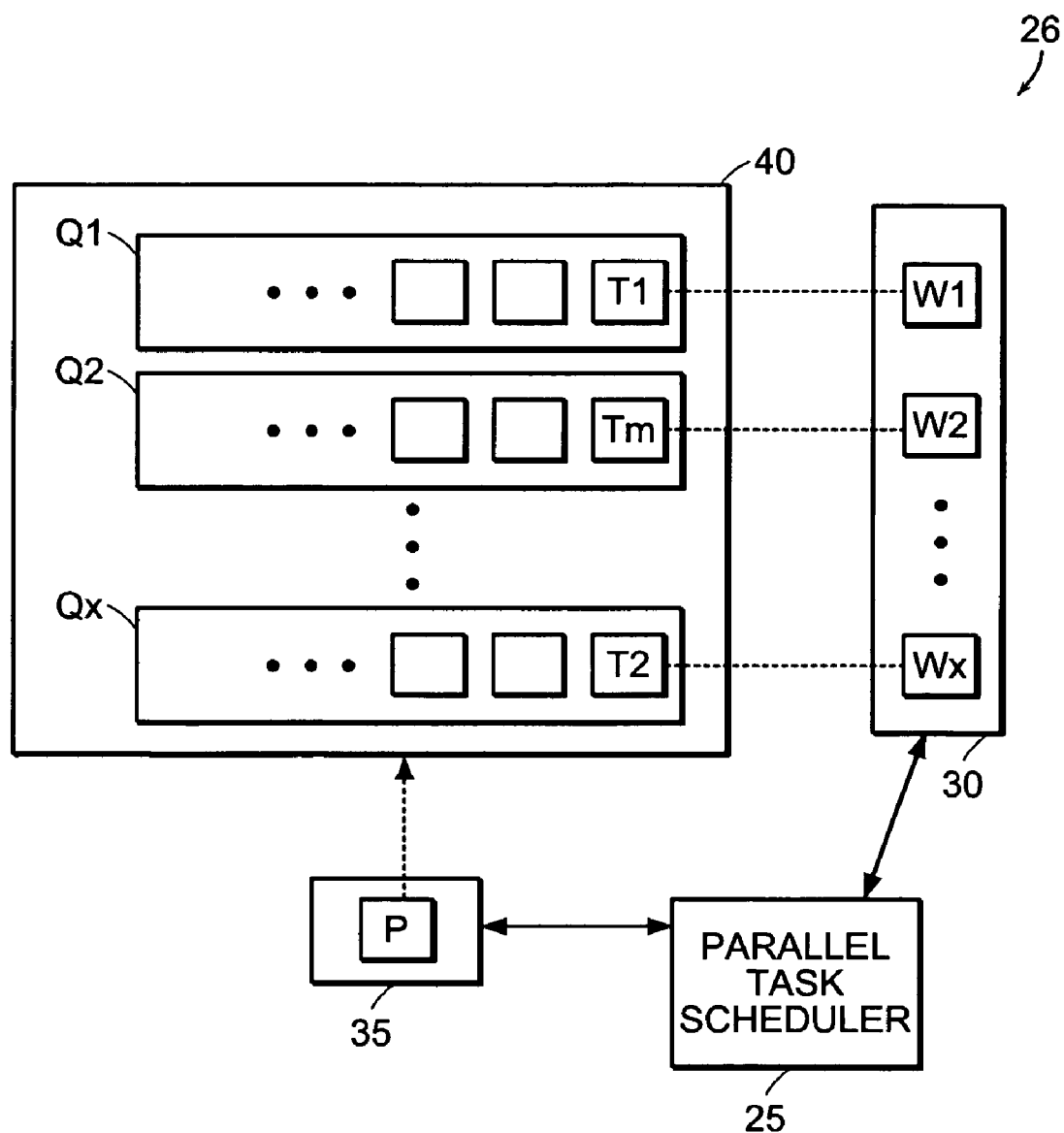
FIG. 7 is a schematic diagram of the system of FIG. 3 showing the assignment of a stolen task.

FIG. 7 is a schematic diagram of the system of FIG. 3 showing the assignment of a stolen task. As shown, the task stealing method 50 (FIG. 6) has been used by the free worker thread W2 to steal the waiting task Tm from the busy queue Qx. The stolen task Tm is now in the second queue Q2 for processing by the associated worker thread W2. That task Tm can now be more efficiently handled.

Those of ordinary skill in the art will recognize that methods involved in the parallel task scheduling system for computers may be embodied in a computer program product that includes a computer usable medium. For example, such a computer usable medium can include a readable memory device, such as a solid state memory device, a hard drive device, a CD-ROM, a DVD-ROM, or a computer diskette, having computer readable program code segments stored thereon. The computer readable medium can also include a communications or transmission medium, such as a bus or a communications link, either optical, wired, or wireless, having program code segments carried thereon as digital or analog data signals.

While this parallel task scheduling system for computers has been particularly shown and described with references to particular embodiments thereof, it will be understood by those skilled in the art that various changes in form and details may be made therein without departing from the scope of the invention encompassed by the appended claims. For example, the methods of the invention can be applied to various environments, and are not limited to the environment described herein.

What is claimed is:

1. In a multithreaded computing environment, a method of processing computing tasks, comprising:
   defining a plurality of worker threads, each thread capable of processing a task;
   defining a plurality of task queues, each task queue capable of queuing a plurality of tasks;
   associating each task queue with a single respective worker thread;
   assigning a task to a task queue in an essentially random fashion, by:
      selecting a task queue;
      determining whether the selected task queue is in a non-empty state;
      repeating the steps of selecting and determining until an empty task queue is found; and
      placing the task in the empty task queue; and
   from a worker thread, processing a task, wherein the task is located, during the act of processing, in a task queue not associated with the thread.

2. The method of claim 1 wherein selecting comprises selecting a task queue believed to be empty.

3. The method of claim 1 further comprising, from a worker thread, processing a task from an associated task queue.

4. The method of claim 1 wherein determining whether the selected task queue is in a non-empty state comprises:
   checking a task in the selected task queue to determine if the task is in the process of being removed by a worker thread; and
   checking a task in the selected task queue to determine if the task is being acted upon by a worker thread.

5. The method of claim 1 wherein assigning a task to a task queue in an essentially random fashion comprises:
   selecting a task queue;
   determining whether the selected task queue is in a non-empty state;
   if the selected task queue is in a non-empty state, stealing a next task in sequence from the non-empty selected task queue by moving the task from the non-empty selected task queue to an associated queue that is empty, otherwise repeating the steps of selecting and determining until a selected task queue in a non-empty state is found.

6. In a multithreaded computing environment, a method of processing computing threads, comprising:
   defining a plurality of worker threads, each thread capable of processing a task;
   defining a plurality of task queues, each task queue capable of queuing a plurality of tasks accessible by the worker threads;
   associating each task queue with a single respective worker thread;
   assigning a task to an assigned task queue, by:
      selecting a task queue;
      determining whether the selected task queue is in a non-empty state;
      repeating the steps of selecting and determining until an empty task queue is found; and
      placing the task in the empty task queue, the empty task queue as a result being designated the assigned task queue; and
   in a worker thread not associated with the assigned task queue, processing the task, wherein the task is located, during the act of processing, in the assigned task queue.

7. The method of claim 6 where assigning comprises selecting the assigned task queue based on an essentially random number.

8. The method of claim 6 wherein selecting comprises selecting a task queue believed to be empty.

9. The method of claim 6 wherein determining whether the selected task queue is in a non-empty state comprises:
   checking a task in the selected task queue to determine if the task is in the process of being removed by a worker thread; and
   checking a task in the selected task queue to determine if the task is being acted upon by a worker thread.

10. The method of claim 6 wherein assigning a task to an assigned task queue comprises:
    selecting a task queue;
    determining whether the selected task queue is in a non-empty state;
    if the selected task queue is in a non-empty state, stealing a next task in sequence from the non-empty selected task queue by moving the task from the non-empty selected task queue to an associated queue that is empty, otherwise repeating the steps of selecting and determining until a selected task queue in a non-empty state is found.

11. In a multithreaded computing environment, a system for processing tasks, comprising:
   a plurality of worker threads, each thread capable of processing a task;
   a plurality of task queues, each task queue capable of queuing a plurality of tasks and each task queue associated with a single respective worker thread;
   a task scheduler for assigning a task to a task queue in an essentially random fashion, by:
      selecting a task queue;
      determining whether the selected task queue is in a non-empty state;
      repeating the steps of selecting and determining until an empty task queue is found; and
      placing the task in the empty task queue; and
   a worker thread processing a task, wherein the task is located, during the act of processing, in a task queue not associated with the thread.

12. The system of claim 11 wherein the task scheduler selects a task queue believed to be empty for assigning the task.

13. The system of claim 11 further comprising a worker thread processing a task from an associated task queue.

14. In a multithreaded computing environment, a system for processing computing threads, comprising:
   a plurality of worker threads, each thread capable of processing a task;
   a plurality of task queues, each task queue capable of queuing a plurality of tasks accessible by the worker threads and each task queue associated with a respective worker thread;
   a task scheduler for assigning a task to an assigned task queue, by:
      selecting a task queue;
      determining whether the selected task queue is in a non-empty state;
      repeating the steps of selecting and determining until an empty task queue is found; and
      placing the task in the empty task queue, the empty task queue as a result being designated the assigned task queue; and
   wherein the assigned task is processed by a thread not associated with the assigned task queue, wherein the task is located, during the act of processing, in the assigned task queue.

15. The system of claim 14 wherein the task scheduler selects the assigned task queue based on an essentially random number.

16. The system of claim 14 wherein the task scheduler selects a task queue believed to be empty for assigning the task.

17. An article of manufacture, comprising:
   a computer-readable storage medium;
   a computer implemented program for processing computing tasks in a multithreaded computing environment embodied in the storage medium, comprising instructions for:
      defining a plurality of worker threads, each thread capable of processing a task;
      defining a plurality of task queues, each task queue capable of queuing a plurality of tasks;
      associating each task queue with a single respective worker thread;
      assigning a task to a task queue in an essentially random fashion, by:
         selecting a task queue;
         determining whether the selected task queue is in a non-empty state;
         repeating the steps of selecting and determining until an empty task queue is found; and
         placing the task in the empty task queue; and
      processing, in a worker thread, a task, wherein the task is located, during the act of processing, in a task queue not associated with the thread.

18. The article of claim 17 wherein the instructions for selecting comprise selecting a task queue believed to be empty.

19. The article of claim 17 further comprising instructions for processing, in a worker thread, a task from an associated task queue.

20. An article of manufacture, comprising:
   a computer-readable storage medium;
   a computer-implemented program for processing computing threads, in a multithreaded computing environment embodied in the storage medium, the program comprising instructions for:
      defining a plurality of worker threads, each thread capable of processing a task;
      defining a plurality of task queues, each task queue capable of queuing a plurality of tasks accessible by the worker threads;
      associating each task queue with a single respective worker thread;
      assigning a task to an assigned task queue, by:
         selecting a task queue;
         determining whether the selected task queue is in a non-empty state;
         repeating the steps of selecting and determining until an empty task queue is found; and
         placing the task in the empty task queue, the empty task queue as a result being designated the assigned task queue; and
      in a worker thread not associated with the assigned task queue, processing the task, wherein the task is located, during the act of processing, in the assigned task queue.

21. The article of claim 20 where the instructions for assigning comprise selecting the assigned task queue based on an essentially random number.

22. The article of claim 20 wherein the instructions for selecting comprise selecting a task queue believed to be empty.

23. In a multithreaded computing environment, a system for processing computing tasks, comprising:
   means for defining a plurality of worker threads, each thread capable of processing a task;
   means for defining a plurality of task queues, each task queue capable of queuing a plurality of tasks;
   means for associating each task queue with a single respective worker thread;
   means for assigning a task to a task queue in an essentially random fashion, by:
      means for selecting a task queue;
      means for determining whether the selected task queue is in a non-empty state;
      means for repeating the steps of selecting and determining until an empty task queue is found; and
      means for placing the task in the empty task queue; and
   from a worker thread, means for processing a task, wherein the task is located, during the act of processing, in a task queue not associated with the thread.

24. The system of claim 23 wherein the means for selecting comprises means for selecting a task queue believed to be empty.

25. The system of claim 23 further comprising, from a worker thread, means for processing a task from an associated task queue.

26. In a multithreaded computing environment, a method of processing computing tasks, comprising:
   defining a plurality of worker threads, each thread capable of processing a task;
   defining a plurality of task queues, each task queue capable of queuing a plurality of tasks;
   associating each task queue with a single respective worker thread;
   assigning a task to an empty task queue in an essentially random fashion, by:
      selecting a task queue;
      determining whether the selected task queue is in a non-empty state;
      repeating the steps of selecting and determining until an empty task queue is found; and
      placing the task in the empty task queue; and
   from a worker thread, processing a task, wherein the task is located, during the act of processing, in a task queue not associated with the thread.

27. The method of claim 26 wherein selecting comprises selecting a task queue believed to be empty.

28. The method of claim 26 further comprising, from a worker thread, processing a task from an associated task queue.

29. The method of claim 26 wherein determining whether the selected task queue is in a non-empty state comprises:
   checking a task in the selected task queue to determine if the task is in the process of being removed by a worker thread; and
   checking a task in the selected task queue to determine if the task is being acted upon by a worker thread.

30. The method of claim 26 wherein assigning a task to an empty task queue in an essentially random fashion comprises:
   selecting a task queue;
   determining whether the selected task queue is in a non-empty state;
   if the selected task queue is in a non-empty state, stealing a next task in sequence from the non-empty selected task queue by moving the task from the non-empty selected task queue to an associated queue that is empty, otherwise repeating the steps of selecting and determining until a selected task queue in a non-empty state is found.

31. In a multithreaded computing environment, a method of processing computing tasks, comprising:
   defining a plurality of worker threads, each thread capable of processing a task;
   defining a plurality of task queues, each task queue capable of queuing a plurality of tasks;
   associating each task queue with a single respective worker thread, an associated task queue capable of storing tasks assigned to an associated worker thread;
   assigning a task to a task queue in an essentially random fashion, comprising:
      using a random number generator to identify an initial task queue;
      upon determining that the initial task queue is in a non-empty state, searching other task queues for an empty task queue; and
      upon finding an empty task queue, storing the task in the empty task queue; and
   from a worker thread, processing a task, wherein the task is located, during the act of processing, in a task queue not associated with the worker thread.

32. The method of claim 31 wherein processing comprises:
   from a worker thread, processing a task from a task queue associated with the thread.

33. The method of claim 31 comprising:
   determining that the initial task queue is in a non-empty state by:
      checking a task in the initial task queue to determine if the task is in the process of being removed by a worker thread; and
      checking a task in the initial task queue to determine if the task is being acted upon by a worker thread.

34. The method of claim 31 wherein assigning a task to a task queue in an essentially random fashion comprises:
   using a random number generator to identify an initial task queue;
   determining whether the initial task queue is in a non-empty state;
   if the initial task queue is in a non-empty state, stealing a next task in sequence from the non-empty initial task queue by moving the task from the non-empty initial task queue to an associated queue that is empty, otherwise repeating the steps of using and determining until an initial task queue in a non-empty state is found.

35. In a computer, a system for processing computing threads, comprising:
   a plurality of worker threads, each thread capable of processing a task;
   a plurality of task queues, each task queue capable of queuing a plurality of tasks accessible by the worker threads and each task queue associated with a single respective worker thread, the associated task queue capable of storing tasks assigned to the associated worker thread;
   a task scheduler for assigning a task to an assigned task queue in an essentially random fashion, the task scheduler using a random number generator to identify an initial task queue, upon determining that the initial task queue is in a non-empty state, searching other task queues for an empty task queue, and upon finding an empty task queue, the task scheduler stores the task in the empty task queue, the empty task queue as a result being designated the assigned task queue, a worker thread processing the task, wherein the task is located, during the act of processing, in the assigned task queue, which is not associated with the worker thread.

36. The system of claim 35 wherein a task scheduler comprises:
   a task scheduler for assigning a task to a task queue in an essentially random fashion, the task scheduler using a random number generator to identify an initial task queue, upon determining that the initial task queue is in a non-empty state, searching other task queues for an empty task queue, and upon finding an empty task queue, the task scheduler stores the task in the empty task queue, the worker thread processing a task assigned to the associated task queue.

37. The system of claim 35 wherein the task scheduler comprises:
   a task scheduler for assigning a task to an assigned task queue in an essentially random fashion, the task scheduler using a random number generator to identify an initial task queue, the task scheduler determining that the initial task queue is in a non-empty state by: checking a task in the initial task queue to determine if the task is in the process of being removed by a worker thread, and checking a task in the initial task queue to determine if the task is being acted upon by a worker thread, upon determining that the initial task queue is in a non-empty state, searching other task queues for an empty task queue, and upon finding an empty task queue, the task scheduler stores the task in the empty task queue, the empty task queue as a result being designated the assigned task queue, a worker thread processing the task, wherein the task is located, during the act of processing, in the assigned task queue, which is not associated with the worker thread.

38. The system of claim 35 wherein the task scheduler comprises:

a task scheduler for assigning a task to an assigned task queue in an essentially random fashion, the task scheduler using a random number generator to identify an initial task queue, the task scheduler determining whether the initial task queue is in a non-empty state, if the initial task queue is in a non-empty state, stealing a next task in sequence from the non-empty initial task queue by moving the task from the non-empty initial task queue to an associated queue that is empty, otherwise using and determining until an initial task queue in a non-empty state is found, the associated empty task queue as a result being designated the assigned task queue, a worker thread processing the task, wherein the task is located, during the act of processing, in the assigned task queue, which is not associated with the worker thread.

39. In a multithreaded computing environment, a system for processing computing threads, comprising:

means for defining a plurality of worker threads, each thread capable of processing a task;

means for defining a plurality of task queues, each task queue capable of queuing a plurality of tasks accessible by the worker threads;

means for associating each task queue with a single respective worker thread;

means for assigning a task to an assigned task queue, by:
means for selecting a task queue;
means for determining whether the selected task queue is in a non-empty state;
means for repeating the steps of selecting and determining until an empty task queue is found; and
means for placing the task in the empty task queue, the empty task queue as a result being designated the assigned task queue; and in a worker thread not associated with the assigned task queue, means for processing the task, wherein the task is located, during the act of processing, in the assigned task queue.

40. In a multithreaded computing environment, a system for processing computing tasks, comprising:

means for defining a plurality of worker threads, each thread capable of processing a task;

means for defining a plurality of task queues, each task queue capable of queuing a plurality of tasks;

means for associating each task queue with a single respective worker thread;

means for assigning a task to an empty task queue in an essentially random fashion, by:
means for selecting a task queue;
means for determining whether the selected task queue is in a non-empty state;
means for repeating the steps of selecting and determining until an empty task queue is found; and
means for placing the task in the empty task queue; and from a worker thread, means for processing a task, wherein the task is located, during the act of processing, in a task queue not associated with the thread.

41. In a multithreaded computing environment, a system for processing computing tasks, comprising:

means for defining a plurality of worker threads, each thread capable of processing a task;

means for defining a plurality of task queues, each task queue capable of queuing a plurality of tasks;

means for associating each task queue with a single respective worker thread, an associated task queue capable of storing tasks assigned to an associated worker thread;

means for assigning a task to a task queue in an essentially random fashion, comprising:
means for using a random number generator to identify an initial task queue;
upon determining that the initial task queue is in a non-empty state, means for searching other task queues for an empty task queue; and
upon finding an empty task queue, means for storing the task in the empty task queue; and from a worker thread, means for processing a task, wherein the task is located, during the act of processing, in a task queue not associated with the worker thread.

42. The system of claim 41 wherein means for processing comprises:

from a worker thread, means for processing a task from a task queue associated with the worker thread.

\* \* \* \* \*

UNITED STATES PATENT AND TRADEMARK OFFICE
CERTIFICATE OF CORRECTION

| | | |
|---|---|---|
| PATENT NO. | : 7,565,651 B1 | Page 1 of 1 |
| APPLICATION NO. | : 09/578290 | |
| DATED | : July 21, 2009 | |
| INVENTOR(S) | : James E. Carey | |

It is certified that error appears in the above-identified patent and that said Letters Patent is hereby corrected as shown below:

On the Title Page, Item (56), under "U.S. Patent Documents", line 6, delete "709/330" and insert -- 719/330 --, therefor.

In column 1, line 7, delete "Modem" and insert -- Modern --, therefor.

Signed and Sealed this

Twenty-ninth Day of June, 2010

David J. Kappos
*Director of the United States Patent and Trademark Office*